May 19, 1931.  J. B. KEMP  1,805,584

GLASS PROTECTOR

Filed Jan. 10, 1930

Jesse B. Kemp, Inventor

Patented May 19, 1931

1,805,584

UNITED STATES PATENT OFFICE

JESSE B. KEMP, OF POMONA, CALIFORNIA

GLASS PROTECTOR

Application filed January 10, 1930. Serial No. 419,950.

This invention aims to provide a simple but efficient means for protecting the edges of glass plates, such as counters, movable panels, partitions, and the like, novel means being provided for receiving the impact of a blow, so that the edge of the glass article will not be damaged.

It is within the province of the disclosure to improve generally and to enhance the utility of devices of that sort to which the present invention appertains.

With the above and other objects in view, which will appear as the description proceeds, the invention resides in the combination and arrangement of parts and in the details of construction hereinafter described and claimed, it being understood that changes may be made in the precise embodiment of the invention herein disclosed, within the scope of what is claimed, without departing from the spirit of the invention.

Figure 1:
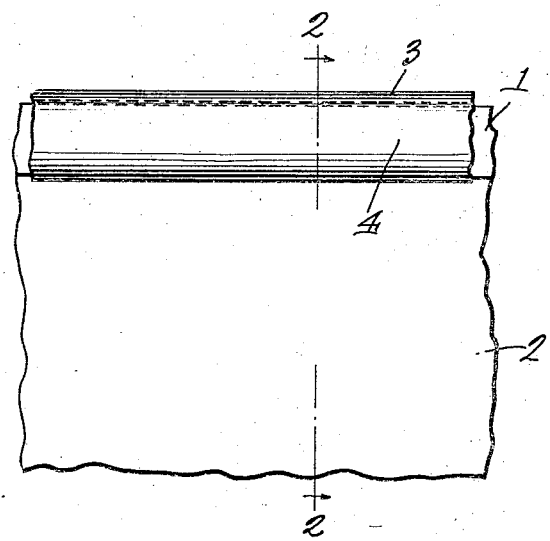
Figure 1 shows in front elevation, a device constructed in accordance with the invention.
Figure 2:
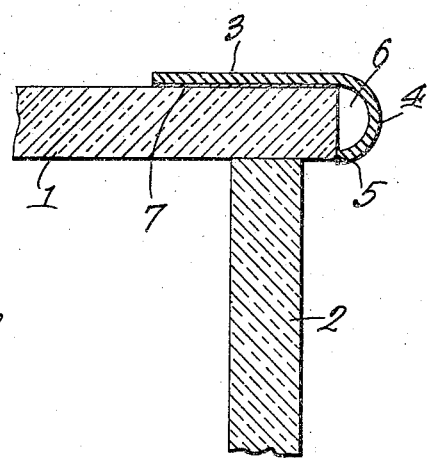
Figure 2 is a section on the line 2—2 of Figure 1.

The numeral 1 designates a horizontal glass counter cooperating with a vertical member 2, which may be the front of a show case.

The numeral 3 designates a strip of soft, bendable metal, which is connected by transparent water-proof cement 7 to the glass member 1. The strip 3 is provided with a curved bead 4 spaced from the edge of the glass member 1 and forming a cavity 6 in front of the edge of the glass member 1. One edge of the curved bead 4 forms a shoulder 5 which abuts against the edge of the glass member 1.

Because the metal in the bead 4 is soft and bendable, and because there is the cavity 6 between the bead 4 and the edge of the glass member 1, the bead 4 will receive the impact of a blow, and bend, thereby preventing the edge of the member 1 from being chipped, or cracked.

Figure 3:
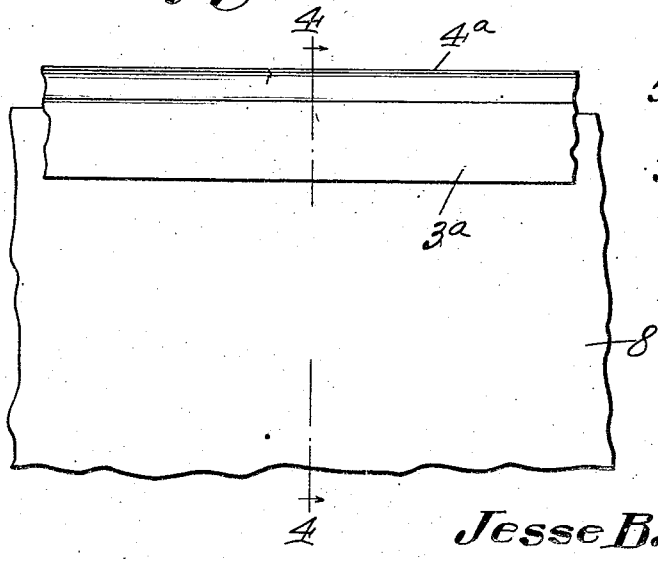
Figure 3 is a front elevation showing a modification.
Figure 4:
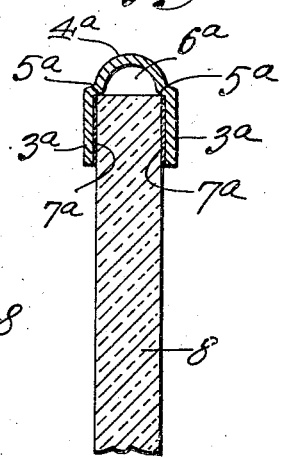
Figure 4 is a section on the line 4—4 of Figure 3.

In Figures 3 and 4, there is shown a glass panel 8. Parts hereinbefore described have been designated by numerals previously used, with the suffix "a". The modification shown in Figure 4 consists in providing two of the strips 3a, the protector, therefore, taking a U-shaped outline in cross section.

The device is extremely simple in construction, but will be found thoroughly effective for protecting the edges of pieces of glass, wherever used.

Having thus described the invention, what is claimed is:

1. A protector of the class described, comprising strips of soft bendable metal connected by a hollow bead, there being shoulders at the places where the bead joins the strips.

2. A protector of soft, bendable metal, comprising strips united by cement with a piece of glass, the protector including a hollow bead, located at the edge of the piece of glass and connecting the strips, the protector having shoulders which engage the piece of glass to prevent the cement from loosening when the bead is bent and partially collapsed, the shoulders being located at the places where the bead joins the strips.

In testimony that I claim the foregoing as my own, I have hereto affixed my signature.

JESSE B. KEMP.